United States Patent Office 3,379,665
Patented Apr. 23, 1968

3,379,665
POLYMERIC COMPOSITIONS OF HIGH VINYL-
IDENE CHLORIDE CONTENT AND THEIR
PREPARATION
Herbert R. Lyon and Harry W. Coover, Jr., Kingsport,
Tenn., assignors to Eastman Kodak Company, Roch-
ester, N.Y., a corporation of New Jersey
No Drawing. Continuation of application Ser. No.
303,435, Aug. 20, 1963. This application June 13,
1966, Ser. No. 557,318
11 Claims. (Cl. 260—29.6)

ABSTRACT OF THE DISCLOSURE

Preparation of improved acrylic-modified vinylidene chloride polymers by two stage emulsion polymerization process wherein a first stage monomer system in water consisting essentially of 70–90% by weight vinylidene chloride and 30–10% by weight acrylonitrile or acrylic acid ester is polymerized essentially to completeness and then adding a second stage monomer system consisting esentially of at least 85% by weight vinylidene chloride and 15% by weight of at least one other acrylonitrile or acrylic acid ester, the water and monomers in the two stages being about equal, the vinylidene chloride in the second stage being greater than the percent vinyl-idene chloride in the first stage and polymerizing the second stage monomer system to cause essentially complete polymerization thereof and to cause association of the second-stage polymer with the first stage polymer.

The process can also be similarly carried out in more than two stages.

---

This application is a continuation of application Ser. No. 303,435, filed Aug. 20, 1963.

The present invention relates to new polymeric compositions, their preparations and their uses.

Among the extensive applications of polymeric materials are their uses as unsupported protective films and supported protective coatings. The commercial preparations of these films and coatings are usually tailored to large-scale production which often necessitates storage of the film or coated product in some compact form such as stacked sheets or rolls. It is readily apparent that these films and coated products must be free from initial tack in order to prevent blocking (adherence of adjacent layers) thereof and allow the sheets or roll layers to be separated. The coatings referred to herein may be applied to all types of base materials, including paper products of many and varied compositions such as those made from rags, straw, bark and other fibrous material, plastic products encompassing all pliable materials whether natural or synthetic, metal products, and so forth.

Polymeric compositions comprised of acrylic-modified vinylidene chloride polymers rich in vinylidene chloride are known to give protective films and coatings exhibit-excellent barrier properties, that is, resistance to the passage of grease, oil, solvents, water, moisture vapor and other gases. The degree of such resistance is mainly a function of the vinylidene chloride content—the higher the vinylidene chloride content (consistent with good emulsion particle coalescence and thus film continuity), the better the resistance. Moreover, such compositions are nontacky and nonblocking which, as aforesaid, are characteristics which enhance their usefulness as films and coatings. Unfortunately, such compositions become brittle and inflexible upon curing or ageing and their utility as protective coverings is thus severely restricted. It is, therefore, of no small significance that the applicants have been able to produce new polymeric com-positions rich in vinylidene chloride and exhibiting the barrier properties, the nontackiness and the flexibility so desirable in protective films and coatings.

Objects of the present invention are: to provide new polymeric compositions rich in vinylidene chloride and exhibiting substantial increases in flexibility and diminutions in tackiness; to provide products comprised of these compositions; and to provide a commercially practicable process for preparing these compositions.

These and other objects, as will hereinafter appear, have been achieved in accordance with the present invention through the discovery that new compositions rich in vinylidene chloride and exhibiting unexpected and desirable combinations of physical properties, particularly barrier, flexibility and freedom from tack, can be prepared by means of a multi-stage, preferably a two-stage, emulsion polymerization process employing certain unique conditions. In this multi-stage process, either vinylidene chloride alone or high percentage thereof along with one or more comonomers is polymerized in the later stages to form the continuous phase in the presence of the first-stage emulsion of a polymeric composition, hereinafter termed disperse phase, containing appreciably less vinylidene chloride. The term "graft copolymer" is often used to define polymeric compositions produced by such two-stage processes. The applicants, however, prefer to describe the interaction between their first and later stage polymers as an "association" since chemical bonding, mixing on a molecular scale and attractive forces in the nature of Van der Waal's might contribute to this interaction.

Films cast from the final stage emulsion have the excellent flexibility and other physical properties of the lower vinylidene chloride content first-stage polymer and, also, the excellent barrier properties and freedom from tack expected of high vinylidene chloride content polymers. In the first-stage monomer system, the useful vinylidene chloride content is between about 70 and 90 percent by weight of the total first-stage monomer, and preferably is between about 75 and 90 percent. In the later-stage monomer systems, the useful vinylidene chloride content is between about 85 and 700 percent by weight of the total later-stage monomer, and preferably is between about 90 and 100 percent. It is noted that for certain applications, pigments, fillers, minerals and other additives such as casein and starch may be incorporated into the new compositions of the present invention at any convenient stage of the preparation.

To obtain a sufficiently low level of tack it is desirable to use an amount of later-stage monomer such that the continuous-phase polymer constitutes at least about 40 percent by weight of the final polymeric product. A composition having an especially useful combination of properties is obtained when the amounts of each stage are approximately equal.

The monomers prefererd in the practice of the invention are vinylidene chloride and ethyl acrylate, but the invention is not limited to ethyl acrylate as the only operable comonomer either in the first or the later stages. Acrylic and methacrylic acids and their amides, imides, esters and nitriles, itaconic and citraconic acid derivatives, fumaric and maleic acid derivatives, vinyl esters, vinyl aromatics, etc., are also useful. Particularly useful comonomers include acrylonitrile and acrylic esters represented by the formula

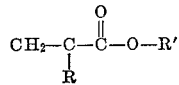

wherein R is a member selected from the group consisting of a hydrogen atom and a methyl radical and R′ is a member selected from the group consisting of hydrocarbon radicals containing from 1–4 carbon atoms. In a broad sense, all copolymerizable monomers exhibiting either

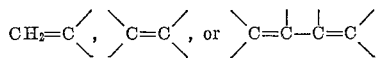

unsaturation may be incorporated into the present compositions by the present process to give useful products. It is sometimes advantageous to use different comonomers in the various stages of the process.

No particular catalyst system is critical and typical useful free radical generating catalysts include inorganic peroxygen compounds such as hydrogen peroxide and the alkali persulfates, organic peroxygen compounds such as benzoyl peroxide, diacetyl peroxide and the like, azo compounds such as $\alpha,\alpha'$-azobisisobutyronitrile, and redox systems such as ammonium persulfate-sodium bisulfite. Regarding the surfacant, many types may be employed including the common anionic or nonionic types and combinations thereof. The alkyl benzene sodium sulfonates are especially useful. Reaction temperature and pH are not critical, nor is the ratio of water to monomers. A final product containing more than 25% solids (polymer) and preferably above 40% solids is oftimes used.

In the present process all of the water may be included in the recipe initially or it can be divided among the polymerization stages. The polymerization can be carried out in batch or continuous operation. The new polymeric compositions are conveniently used in emulsion form; however, for certain applications it may be desirable to isolate the product, dissolve it in an appropriate solvent and cast a film from the resulting solution or dope.

The following examples will further illustrate the invention.

Example 1

This example illustrates the present two-stage batch process.

First stage.—To a reaction vessel equipped with means for stirring and means for controlling temperature were added 50 parts of deaerated water, 0.25 part of Ultrawet 30DS surfactant (sodium alkyl aryl sulfonate), 0.25 part ammonium persulfate, sufficient acid such as acetic or phosphoric to give a pH of 3–5, and 50 parts of a first monomer system consisting essentially of 86% vinylidene chloride and 14% ethyl acrylate by weight. The charge was stirred until monomer, water and surfactant were thoroughly mixed and 0.2 part of sodium metabisulfite were then added. The polymerization was carried out with stirring at 28° C. until it was essentially complete and an emulsion was obtained.

Second stage.—Into the first-stage emulsion were added, with constant stirring, 0.25 part of Ultrawet 30DS surfactant, 50 parts of deaerated water, 0.25 part of ammonium persulfate, 50 parts of a second monomer system consisting essentially of 95% vinylidene chloride and 5% ethyl acrylate by weight and 0.2 part of sodium metabisulfite. The reaction mixture was stirred constantly and the temperature maintained near 28° C. until polymerization was complete. 1.5–3% by weight of Ultrawet 30DS surfactant based on the total polymer weight was added to the final emulsion to stabilize the same.

A sample of the solid polymeric composition isolated by coagulating the above final emulsion had an intrinsic viscosity of 0.70 and contained 90.5% vinylidene chloride and 9.5% ethyl acrylate by weight. A 1.0 mil film was cast from the final emulsion onto paper and had excellent gloss and appearance. The coating was free from initial tack, exhibited good slip properties, and, after aging, exhibited no tendencies to crack or break. The coating also had excellent barrier properties and transmitted only 0.15 g. $H_2O$(vapor)/100 in.$^2$/24 hr. An unsupported 2-mil film cast from the emulsion was tough and flexible and had an elongation of 100%.

Example 2

This example illustrates that a copolymeric composition prepared from essentially the same ingredients used in Example 1, but, by a one-stage process, had inferior physical properties, particularly elongation and resistance to water vapor, and was so tacky that it could not be used for the intended purposes.

The copolymer was prepared using 90 parts of vinylidene chloride, 10 parts of ethyl acrylate and the same concentrations of reagents as was used in Example 1. The reaction was carried out by adding the ingredients to a polymerization vessel, stirring and then adding the bisulfite. After the polymerization was complete, the final emulsion was stabilized as in Example 1. A polymer sample isolated by coagulating the final emulsion had an I.V. of 0.71 and contained 90.5% vinylidene chloride and 9.5% ethyl acrylate by weight. Paper coated from this emulsion with a 1.0 mil film had fairly good gloss and appearance, but, the coating was quite tacky and had very poor slip properties. The coating transmitted 0.35 g. $H_2O$(vapor)/100 in.$^2$/24 hr. and after aging tended to develop cracks. An unsupported 2-mil film cast from the final emulsion was somewhat brittle and had an elongation of 10%.

Example 3

In this example a copolymer having a 95/5 weight percent ratio of vinylidene chloride/ethyl acrylate was prepared by the process of Example 2 and exhibited slip and tack properties similar to those of the two-stage prepared polymeric composition of Example 1, but, exhibited poor physical properties (extreme brittleness). A sample of this copolymer isolated by coagulating the final emulsion had an I.V. of 0.70 and by analysis contained 95% vinylidene chloride and 5% ethyl acrylate by weight. Paper coated with a 1-mil film cast from this emulsion was free from initial tack but was too brittle for other properties thereof to be measured. A 2-mil film cast from the final emulsion onto a glass plate was so brittle it could not be removed.

Example 4

In this example a copolymer having an 86/14 weight percent ratio of vinylidene chloride/ethyl acrylate was prepared as in Example 2 and exhibited certain good physical properties, e.g., high elongation, but, was so tacky it could not be used. A sample of this copolymer isolated by coagulating the final emulsion had an I.V. of 0.72. Paper coated with a 1-mil film cast from this emulsion was reasonably good in appearance, but, was so tacky that a rolled-up section thereof could not be unrolled. An unsupported 2-mil film cast from this emulsion had an elongation of 100% but was quite sticky.

The following examples will further illustrate the allowable variations in the compositions of the monomer systems.

Example 5

The procedure of Example 1 was followed except that a monomer system consisting essentially of 86% vinylidene chloride, 7% n-butyl acrylate and 7% ethyl acrylate by weight was used in the first stage. Paper coated with a 1.0 mil film cast from the final emulsion had excellent gloss and was free from initial tack. It had good barrier properties and transmitted only 0.2 g. $H_2O$(vapor)/100 in.$^2$/24 hr.

Example 6

The procedure of Example 1 was followed except that a monomer system consisting essentially of 80% vinylidene chloride, 15% ethyl acrylate and 5% acrylonitrile by weight was used in the first stage. Paper coated with an 0.8 mil film cast from the final emulsion had good gloss and no initial tack. It had good barrier properties and transmitted 0.25 g. $H_2O$(vapor)/100 in.$^2$/24 hr.

Example 7

The procedure of Example 1 was followed except that a monomer system consisting essentially of 80% vinylidene chloride, 15% n-butyl acrylate and 5% acrylonitrile by weight was used in the first stage. Paper coated with a 1.0 mil film cast from the final emulsion had high gloss and was free from initial tack. It had good barrier properties and transmitted only 0.2 g. $H_2O$(vapor)/100 in.$^2$/24 hr.

Example 8

The procedure for Example 1 was followed except that a monomer system consisting essentially of 96% vinylidene chloride and 4% methyl acrylate by weight was used in the second stage. A 1.0 mil unsupported film cast from the final emulsion had excellent gloss and appearance. It transmitted only 0.15 g. $H_2O$(vapor)/100 in.$^2$/24 hr., and was free fro minitial tack.

Example 9

The procedure of Example 1 was followed except that a monomer system consisting essentially of 93% vinylidene chloride, 3.5% ethyl acrylate, and 3.5% acrylonitrile by weight was used in the second stage. Paper coated with an 0.8 mil film cast from the final emulsion had excellent gloss and was free from initial tack. It had excellent barrier properties and transmitted 0.35 g. $H_2O$(vapor)/100 in.$^2$/24 hr.

Example 10

The procedure of Example 1 was followed except that a monomer system consisting essentially of 94% vinylidene chloride, 3% methyl acrylate, and 3% acrylonitrile by weight was used in the second stage. Paper coated with a 1 mil film cast from the final emulsion was free from initial tack. It transmitted 0.2 g. $H_2O$(vapor)/100 in.$^2$/24 hr.

Example 11

The procedure of Example 1 was followed except that a monomer system consisting essentially of 80% vinylidene chloride, 15% ethyl acrylate, and 5% acrylonitrile by weight was used in the first stage and a monomer mixture consisting of 94% vinylidene chloride, 3% methyl acrylate and 3% n-butyl acrylate by weight was used in the second stage. Paper coated with a 1 mil film cast from the final emulsion had excellent gloss, transmitted 0.15 g. $H_2O$(vapor)/100 in.$^2$/24 hr., and was free from initial tack.

Example 12

The following example illustrates a three-stage batch process.

First stage.—To a reaction vessel equipped with means for stirring and means for controlling temperature were added 50 parts of deaerated water, 0.25 part of Ultrawet 30DS surfactant (sodium alkyl aryl sulfonate), 0.25 part ammonium persulfate, sufficient acid such as acetic or phosphoric to give a pH of 3–5, and 50 parts of a first monomer system consisting essentially of 80% vinylidene chloride and 20% ethyl acrylate by weight. The charge was stirred until monomer, water, and surfactant were thoroughly mixed and 0.2 part of metabisulfite were then added. The polymerization was carried out with stirring at 28° C. until it was essentially complete and an emulsion was formed.

Second stage.—Into the first-stage emulsion were added, with constant stirring, 0.25 part of Ultrawet 30DS surfactant, 50 parts of deaerated water, 0.25 part of ammonium persulfate, 50 parts of a second monomer system consisting essentially of 86% vinylidene chloride and 14% ethyl acrylate by weight, and 0.25 part of sodium metabisulfite. The reaction mixture was stirred constantly and the temperature maintained near 28° C. until the second-stage polymerization was essentially complete. A stable emulsion was obtained.

Third stage.—Into the emulsion obtained in the second stage were added, with constant stirring, 0.25 part of Ultrawet 30DS surfactant, 50 parts of deaerated water, 0.25 part of ammonium persulfate, 50 parts of a third monomer system consisting essentially of 95% vinylidene chloride and 5% ethyl acrylate by weight, and 0.2 part of metabisulfite. The reaction mixture was stirred constantly and the temperature maintained near 28° C. until polymerization was essentially complete. 1.5–3% by weight of Ultrawet 30DS surfactant based on the total polymer weight was added to the final emulsion to stabilize the same. A sample of the solid polymer composition isolated by coagulating the above emulsion had an intrinsic viscosity of 0.70 and contained 90.5% vinylidene chloride and 9.5% ethyl acrylate by weight. A 1.0 mil film was cast from the final emulsion onto paper and had excellent gloss and appearance. The coating was free from initial tack and, after aging, had excellent resistance to cracking and breaking. The coating also had excellent barrier properties and transmitted only 0.2 g. of water (100 in.$^2$/24 hr.).

The invention has been described in detail with particular reference to preferred embodiments thereof but it will be understood that variations and modifications can be effected within the spirit and scope of the invention as described hereinabove and as defined in the appended claims.

What is claimed is:

1. A polymeric composition of matter capable of giving films and coatings having an improved combination of the properties of flexibility, barrier and freedom from tack, said composition being prepared by a two-stage process comprising:

emulsion polymerizing essentially to completeness, in the presence of a free radical type catalyst at temperatures sufficient to render said catalyst active to promote the polymerization, a first stage monomer system in water, said first stage monomer system consisting essentially of about 70–90 percent by weight of vinylidene chloride and about 30–10 percent by weight of at least one other copolymerizable vinyl monomer selected from the group consisting of acrylonitrile and acrylic etsers represented by the formula

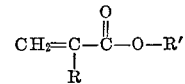

wherein R is a hydrogen atom or a methyl radical and R' is a hydrocarbon radical containing from 1–4 carbon atoms;

adding to the resultant polymeric emlusion a second stage monomer system in water, said second stage monomer system consisting essentially of at least 85 percent by weight of vinylidene chloride and 15 percent by weight of at least one other copolymerizable vinyl monomer selected from the group consisting of acrylonitrile and acrylic esters represented by the formula

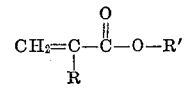

wherein R is a hydrogen atom or a methyl radical and R' is a hydrocarbon radical containing from 1–4 carbon atoms;

the water in each of said first and second stage monomer systems being substantially equal in parts by weight;

the weight of the monomers in said second monomer system being about equal to the weight of the monomers in said first monomer system;

the percent of vinylidene chloride in said second monomer system being greater than the percent of vinylidene chloride in said first monomer system; and subsequently subjecting the said second stage monomer system to polymerization conditions in the presence of a free-radical type catalyst to cause essentially complete polymerization of said second monomer system and to cause association of the second-stage polymer with the first-stage polymer.

2. A polymeric composition of matter capable of giving films and coatings having an improved combination of the properties of flexibility, barrier and freedom from tack, said composition being prepared by a two-stage process comprising:

emulsion polymerizing essentially to completeness, in the presence of a free-radical type catalyst at temperatures sufficient to render said catalyst active to promote the polymerization, a first stage monomer system in water;

said first stage monomer system consisting essentially of about 70–90 percent by weight of vinylidene chloride and about 30–10 percent by weight of ethyl acrylate;

adding to the resultant polymeric emulsion a second stage monomer system in water, said second stage monomer system consisting essentially of at least 90 percent by weight of vinylidene chloride and 10 percent by weight of ethyl acrylate;

the water in each of said first and second stage monomer systems being substantially equal in parts by weight;

the weight of the monomers in said second monomer system being about equal to the weight of the monomers in said first monomer system;

the percent of vinylidene chloride in said second monomer system being greater than the percent of vinylidene chloride in said first monomer system; and subjecting the said second stage monomer system to polymerization conditions in the presence of a free-radical type catalyst to cause essentially complete polymeriaztion of said second monomer system and to cause association of the second stage polymer with the first stage polymer.

3. A polymeric composition of matter capable of giving films and coatings having an improved combination of the properties of flexibility, barrier and freedom from tack, said composition being prepared by a two-stage process comprising:

emulsion polymerizing essentially to completeness, in the presence of a free-radical type catalyst at temperatures sufficient to render said catalyst active to promote the polymerization, a first stage monomer system in water, said first stage monomer system consisting essentially of about 70–90 percent by weight of vinylidene chloride and about 30–10 percent by weight of a mixture of n-butyl acrylate and ethyl acrylate;

adding to the resultant polymeric emulsion a second stage monomer system in water, said second stage monomer system consisting essentially of at least 85 percent by weight of vinylidene chloride and 15 percent by weight of ethyl acrylate;

the water in each of said first and second stage monomer systems being substantially equal in parts by weight;

the weight of the monomers in said second monomer system being about equal to the weight of the monomers in said first monomer system;

the percent of vinylidene chloride in said second monomer system being greater than the percent of vinylidene chloride in said first monomer system; and subsequently subjecting the second stage monomer system to polymerization conditions in the presence of a free-radical type catalyst to cause essentially complete polymerization of said second monomer system and to cause association of the second stage polymer with the first-stage polymer.

4. A polymeric composition of matter capable of giving films and coatings having an improved combination of the properties of flexibility barrier and freedom from tack, said composition being prepared by a two-stage process comprising:

emulsion polymerizing essentially to completeness, in the presence of a free-radical type catalyst at temperatures sufficient to render said catalyst active to promote the polymerization, a first stage monomer system in water, said first stage monomer system consisting essentially of about 70–90 percent by weight of vinylidene chloride and about 30–10 percent by weight of a mixture of ethyl acrylate and acrylonitrile;

adding to the resultant polymeric emulsion a second stage monomer system in water, said second stage monomer system consisting essentially of at least 85 percent by weight of vinylidene chloride and 15 percent by weight of ethyl acrylate;

the water in each of said first and second stage monomer systems being substantially equal in parts by weight;

the weight of the monomer in said second monomer system being about equal to the weight of the monomers in said first monomer system;

the percent of vinylidene chloride in said second monomer system being greater than the percent of vinylidene chloride in said first monomer system; and subsequently subjecting the said second stage monomer system to polymerization conditions in the presence of a free-radical type catalyst to cause essentially complete polymerization of said second monomer system and to cause association of the second stage polymer with the first-stage polymer.

5. A polymeric composition of matter capable of giving films and coatings having an improved combination of the properties of flexibility, barrier and freedom from tack, said composition being prepared by a two-stage process comrising:

emulsion polymerizing essentially to completeness, in the presence of a free-radical type catalyst at temperatures sufficient to render said catalyst active to promote the polymerization, a first stage monomer system in water, said first stage monomer system consisting essentially of about 70–90 percent by weight of vinylidene chloride and about 30–10 percent by weight of a mixture of n-butyl acrylate and acrylonitrile;

adding to the resultant polymeric emulsion a second stage monomer system in water, said second stage monomer system consisting essentially of at least 85 percent by weight of vinylidene chloride and 15 percent by weight of ethyl acrylate;

the water in each of said first and second stage monomer systems being substantially equal in parts by weight;

the weight of the monomers in said second monomer system being about equal to the weight of the monomers in said first monomer system;

the percent of vinylidene chloride in said second monomer system being greater than the percent of vinylidene chloride in said first monomer system; and subsequently subjecting the said second stage monomer system to polymerization conditions in the presence of a free-radical type catalyst for a sufficient period of time to cause essentially complete polymerization of said second monomer system and to cause association of the second stage polymer with the first-stage polymer.

6. A polymeric composition of matter capable of giving films and coatings having an improved combination of the properties of flexibility, barrier and freedom from tack, said composition being prepared by a two-stage process comprising:

emulsion polymerizing essentially to completeness, in the presence of a free-radical type catalyst active to promote the polymerization, a first stage monomer system in water, said first stage monomer system consisting essentially of about 70–90 percent by weight of vinylidene chloride and about 30–10 percent by weight of ethyl acrylate;

adding to the resultant polymeric emulsion a second stage monomer system in water, said second stage monomer system consisting essentially of at least 85 percent by weight of vinylidene chloride and 15 percent by weight of a mixture of ethyl acrylate and acrylonitrile;

the water in each of said first and second stage monomer systems being substantially equal in parts by weight;

the weight of the monomers in said second monomer system being about equal to the weight of the monomers in said first monomer system;

the percent of vinylidene chloride in said second monomer system being greater than the percent of vinylidene chloride in said first monomer system; and subsequently subjecting the said second stage monomer system to polymerization conditions in the presence of a free-radical type catalyst for a sufficient period of time to cause essentially complete polymerization of said second monomer system and to cause association of the second stage polymer with the first-stage polymer.

7. A polymeric composition of matter capable of giving films and coatings having an improved combination of the properties of flexibility, barrier and freedom from tack, said composition being prepared by a two-stage process comprising:

emulsion polymerizing essentially to completeness, in the presence of a free-radical type catalyst at temperatures sufficient to render said catalyst active to promote the polymerization, a first stage monomer system in water, said first stage monomer system consisting essentially of about 70–90 percent by weight of vinylidene chloride and about 30–10 percent by weight of ethyl acrylate;

adding to the resultant polymeric emulsion a second stage monomer system in water, said second stage monomer system consisting essentially of at least 85 percent by weight of vinylidene chloride and 15 percent by weight of a mixture of methyl acrylate and acrylonitrile;

the water in each of said first and second stage monomer systems being substantially equal in parts by weight;

the weight of the monomers in said second monomer system being about equal to the weight of the monomers in said first monomer system;

the percent of vinylidene chloride in said second monomer system being greater than the percent of vinylidene chloride in said first monomer system; and subsequently subjecting the said second stage monomer system to polymerization conditions in the presence of a free-radical type catalyst for a sufficient period of time to cause essentially complete polymerization of said second monomer system and to cause association of the second stage polymer with the first-stage polymer.

8. A polymeric composition of matter capable of giving films and coatings having an improved combination of the properties of flexibility, barrier and freedom from tack, said composition being prepared by a two-stage process comprising:

emulsion polymerizing essentially to completeness, in the presence of a free-radical type catalyst at temperatures sufficient to render said catalyst active to promote the polymerization, a first stage monomer system in water, said first stage monomer system consisting esentially of about 70–90 percent by weight of vinylidene chloride and about 30–10 percent by weight of a mixture of ethyl acrylate and acrylonitrile;

adding to the resultant polymeric emulsion a second stage monomer system in water, said second stage monomer system consisting essentially of at least 85 percent by weight of vinylidene chloride and 15 percent by weight of a mixture of methyl acrylate and n-butyl acrylate;

the water in each of said first and second stage monomer systems being substantially equal in parts by weight;

the weight of the monomers in said second monomer system being about equal to the weight of the monomers in said first monomer system;

the percent of vinylidene chloride in said second monomer system being greater than the percent of vinylidene chloride in said first monomer system; and subsequently subjecting the said second stage monomer system to polymerization conditions in the presence of a free-radical type catalyst for a sufficient period of time to cause essentially complete polymerization of said second monomer system and to cause association of the second stage polymer with the first-stage polymer.

9. A polymeric composition of matter capable of giving films and coatings having an improved combination of the properties of flexibility, barrier and freedom from tack, said composition being prepared by a multi-stage process comprising:

emulsion polymerizing essentially to completeness, in the presence of a free-radical type catalyst at temperatures sufficient to render said catalyst active to promote the polymerization, a first-stage monomer system in water, said first stage monomer system consisting essentially of about 70–90 percent by weight of vinylidene chloride and about 30–10 percent by weight of at least one other copolymerizable vinyl monomer;

adding to the resultant polymeric emulsion a second stage monomer system in water, said second stage monomer system consisting essentially of at least 85 percent by weight of vinylidene chloride and 15 percent by weight of at least one other copolymerizable vinyl monomer;

the water in each of said first and second stage monomer systems being substantially equal in parts by weight;

subsequently subjecting the said second stage monomer system to polymerization conditions in the presence of a free-radical type catalyst to cause association of the second stage polymer with the first-stage polymer;

adding to the resultant polymeric emulsion a third stage monomer system in water, said third stage monomer system consisting essentially of at least 85 percent by weight of vinylidene chloride and 15 percent by weight of at least one other coploymerizable vinyl monomer;

subsequently subjecting the third stage monomer system to polymerization conditions in the presence of a free-radical type catalyst to cause association of the third stage polymer with the first and second stage polymers;

the water in each of said first, second and third stage monomer systems being substantially equal in parts by weight;

the weight of the monomers in each of said first, second and third monomer systems being about equal and the proportion of vinylidene chloride in said second monomer system and in said third monomer system being greater than the proportion of vinylidene chloride in said first monomer system; and said third monomer system also differing from said second monomer system.

10. A coating of the composition of claim 1 on a substrate.

11. A coating of the composition of claim 9 on a substrate.

References Cited

UNITED STATES PATENTS

| | | | |
|---|---|---|---|
| 2,894,927 | 7/1959 | Elder et al. | 260—29.6 |
| 2,961,421 | 11/1960 | Cohen et al. | 260—29.6 |
| 3,108,017 | 11/1963 | Messwarb et al. | 117—138.8 |
| 3,230,206 | 1/1966 | Albert et al. | 260—86.3 |
| 3,240,742 | 3/1966 | Hahn et al. | 260—30.4 |
| 3,282,867 | 11/1966 | Stahly et al. | 260—29.7 |

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,379,665                                      April 23, 1968

Herbert R. Lyon et al.

It is certified that error appears in the above identified patent and that said Letters Patent are hereby corrected as shown below:

Column 1, line 23, "15%" should read -- 15-0% --; line 57, "exhibit" should read -- exhibiting --. Column 2, line 19, after "or" insert -- a --; line 42, "700" should read -- 100 --; line 48, "the" should read -- their --. Column 5, line 18, "fro minitial" should read -- from initial --. Column 6, line 56, column 7, line 59, column 8, lines 18 and 52, column 9, lines 11 and 45, and column 10, lines 6, 42 and 55, "15", each occurrence, should read -- 15-0 --. Column 7, line 24, "10" should read -- 10-0 --. Column 8, line 23, "monomer" should read -- monomers --; line 39, "comrising" should read -- comprising --. Column 9, line 1, after "catalyst" insert -- at temperatures sufficient to render said catalyst --.

Signed and sealed this 10th day of March 1970.

(SEAL)
Attest:

EDWARD M. FLETCHER, JR.                      WILLIAM E. SCHUYLER, JR.
Attesting Officer                                Commissioner of Patents